United States Patent [19]

Birchall et al.

[11] Patent Number: 5,017,525

[45] Date of Patent: * May 21, 1991

[54] PRODUCTION OF CERAMIC MATERIALS AND OF PRECURSOR THEREFOR

[75] Inventors: James D. Birchall, Mouldsworth; Mary J. Mockford, Upton; David R. Stanley, Knutsford; Paul M. L. Asher, Tarvin; William R. McCarthy, Warrington, all of United Kingdom

[73] Assignee: Imperial Chemical Industries PLC, London, England

[*] Notice: The portion of the term of this patent subsequent to Aug. 29, 2006 has been disclaimed.

[21] Appl. No.: 169,574

[22] Filed: Mar. 17, 1988

[30] Foreign Application Priority Data

Mar. 25, 1987 [GB] United Kingdom ............... 8707054

[51] Int. Cl.$^5$ .............................................. C04B 35/58
[52] U.S. Cl. ........................................ 501/87; 501/96; 501/98; 501/102; 501/126; 501/127; 501/128; 501/132; 501/153; 501/154; 423/289; 423/297; 423/344; 423/345; 423/406; 423/409; 423/439; 423/440
[58] Field of Search ............... 501/87, 96, 98, 102, 501/126, 127, 128, 132, 153, 154; 423/289, 344, 345, 406, 409, 439, 440, 297

[56] References Cited

U.S. PATENT DOCUMENTS

| Re. 31,788 | 1/1985 | Iwai et al. | 423/290 |
|---|---|---|---|
| 2,697,029 | 12/1954 | Baker et al. | 528/32 |
| 4,333,916 | 6/1982 | Iwai et al. | 501/87 |
| 4,861,735 | 8/1989 | Birchall et al. | 501/96 |

FOREIGN PATENT DOCUMENTS

| 0239301 | 9/1987 | European Pat. Off. | 501/87 |
|---|---|---|---|
| 57-17412 | 1/1982 | Japan . | |

OTHER PUBLICATIONS

Yajima et al., "Continuous Silicon Carbide Fiber of High Tensile Strength", Chemistry Letters, (1975), pp. 931-934.
Yajima et al., "Development of High Tensile Strength Silicon Carbide Fibre Using An Organosilicon Polymer Precursor", Nature, 273 (1978), pp. 525-527.
Hanna et al., "Pyrolysis and Combustion of Treated and Untreated Rice Hulls", Thermochimica Acta, 81 (1984), pp. 77-86.

Primary Examiner—William R. Dixon, Jr.
Assistant Examiner—Anthony J. Green
Attorney, Agent, or Firm—Cushman, Darby & Cushman

[57] ABSTRACT

A process for the production of a precursor which is a polymeric material comprising at least one metallic or non-metallic element, oxygen and carbon and from which a ceramic material, e.g. a carbide, nitride, boride, or silicide, may be produced by pyrolysis, which process comprises reacting (1) a first reactant which comprises a compound or compounds of at least one metallic or non-metallic element having two or more groups reactive with hydroxyl groups, and
(2) a second reactant which comprises at least one organic compound having two or more hydroxyl groups, said reaction being effected in a liquid medium in which the reactants are soluble and/or dispersible and in which the polymeric material which is produced by the reaction is insoluble or in which the polymeric material may be caused to be insoluble, precipitating the polymeric material in the liquid medium in particulate form, and recovering the polymeric material from the liquid medium in particulate form.

27 Claims, No Drawings

PRODUCTION OF CERAMIC MATERIALS AND OF PRECURSOR THEREFOR

This invention relates to a process for the production of a precursor which is a polymeric material and from which a ceramic material may be produced, and to a process which includes the additional step or steps of producing ceramic material from the precursor. The ceramic material may be, for example, a carbide, nitride, boride or silicide of a metallic or non-metallic element.

Particles of refractory carbides have traditionally been produced by the so-called carbothermic reaction in which an intimate mixture of carbon and an oxide of the metallic or non-metallic element is heated in an inert atmosphere. For example, in the production of silicon carbide an intimate mixture of carbon and silica is reacted according to the overall equation $$SiO_2 + 3C \rightarrow SiC + 2CO$$

In order to produce the nitride the reaction may be effected in the presence of a reactive nitrogen-containing gas, for example nitrogen itself or ammonia. Thus, in the case where the carbothermic reaction is effected in the presence of nitrogen the reaction may be expressed according to the overall equation $$3SiO_2 + 6C + N_2 \rightarrow Si_3N_4 + 6CO$$

The problems associated with the carbothermic reaction are illustrated by the problems associated with the production of silicon carbide. Thus, in the production of silicon carbide an intimate mixture of carbon and silica is fired in an inert atmosphere at a temperature which may be as high as 2500° C., the firing generally being effected in an electric furnace. This traditional process suffers from a problem in that, although the proportion of silica to carbon which is necessary in order to produce silicon carbide may readily be achieved, it is difficult to achieve the necessary intimate contact between the carbon and the silica in order that a product of uniform composition may be produced, that is of uniform composition on a molecular scale. In particular, the particles which are produced, which are nominally silicon carbide, may be contaminated with unreacted silica and/or carbon. This is the case even when very small particles of silica and carbon are used, for example silica sol and carbon black. Furthermore, in this traditional process it is also difficult to produce particles of silicon carbide having a very small size, e.g. a size of less than 1 micron.

It has been proposed to produce ceramic materials such as silicon carbide by pyrolysis of organic polymeric materials which contain the elements of the ceramic material, for example silicon and carbon in the case of silicon carbide, but which do not contain oxygen. In such a process the polymeric material is first coked to convert the organic component of the polymeric material to carbon, and the carbon and silicon are then reacted in a pyrolysis reaction. This is not the traditional carbothermic reaction in which carbon and silica are reacted. The objective of using such a polymeric material is to achieve in a coked product produced from the polymeric material a more intimate mixture of the elements of the ceramic material, such as silicon and carbon, than can be achieved, for example, with a physical mixture of silica and carbon in the production of silicon carbide.

An early example of such a "pre-ceramic" polymeric material is provided by U.S. Pat. No. 2 697 029 in which there is described the production of a polymeric material by copolymerisation of a silyl substituted monomer, e.g. trimethylsilyl styrene, and another monomer, e.g. divinyl benzene or ethyl vinyl benzene, to give a cross-linked resin, and pyrolysis of the resin to give a solid containing carbon and silicon.

Further examples of such "pre-ceramic" materials are the carbosilanes produced by the pyrolysis of dodecamethylcyclohexasilane (Yajima et al Chem. Lett. 1975, 1931) and by heating poly(dimethylsilane) in an autoclave (Yajima 1976 Nature v.273, p525). These carbosilanes may be melt spun to fibrous materials from which refractory silicon carbide may be produced by heating at high temperature. The reaction which is effected at high temperature is between the silicon and carbon and it is not the traditional carbothermic reaction referred to previously, that is the reaction between silica and carbon. This process suffers from the disadvantage that the silicon carbide product is impure.

A more recent example of such a "pre-ceramic" material from which a refractory carbide may be produced is provided by Japanese Patent Publication No 57-17412 in which there is described a process in which a halogen compound or an alkoxide of silicon, vanadium, zirconium, tantalum or tungsten is reacted with a carbohydrate and the resultant reaction product is fired. The halogen compound or alkoxide may be, for example, $SiCl_4$, $ZrOCl_2$, $Si(OC_2H_5)_4$, $Si(OC_2H_5)_3C_2H_5$, $Si(OC_2H_5)_2(CH_3)_2$, $Zr(OC_4H_9)_4$, $WCl_2(OC_2H_5)_4$, and the carbohydrate may be, for example, a monosaccharide or a polysaccharide, e.g. glucose, galactose, arabinose, starch, or cellulose. The reaction may be effected in the absence of a solvent but it is preferably effected in the presence of a solvent, for example, an aromatic solvent, e.g. benzene or toluene; an aliphatic solvent, e.g. hexane, heptane or octane; or a halogenated aromatic or aliphatic solvent. The reaction product is fired in the presence of an inert gas at a temperature in the range 700° to 2700° C. Prior to firing at a very high temperature a coked reaction product containing carbon and an oxide of Si, Zr, V, Ta or W may be produced by heating the reaction product at relatively low temperature and this coked product may be crushed to a fine powder. Although in this publication it is stated that the reaction between the halogen compound or alkoxide and the carbohydrate may be effected in a solvent and that the solvent may be used in an amount which is sufficient to dissolve or suspend the carbohydrate we find that the carbohydrates which are disclosed are not soluble in the solvents and are only capable of being suspended therein in a particulate form with the result that the reaction does not result in production of a reaction product of uniform composition or which is in a particularly tractable form. Indeed, the reaction product must be crushed in order to produce a powder, and the refractory carbide produced from the reaction product also does not have a uniform composition.

A recent development which is described in Thermochimica Acta, 81 (1984) 77-86, is the production of silicon carbide by the pyrolysis of rice hulls. Rice hulls consist of silica and cellulose, and they yield a mixture of silica and carbon when thermally decomposed. Rice hulls have a very high surface area and this, together with the intimate contact between the carbon and silica in the thermally decomposed rice hulls, enables silicon carbide to be formed by subsequent pyrolysis in an inert atmosphere or in a reducing atmosphere at relatively low temperatures. Production may be effected in a two-step process in which rice hulls are coked by heating in the absence of air at a relatively low temperature, e.g. at 700° C., in order to decompose the cellulose into amorphous carbon, and the thus coked rice hulls containing carbon and silica are heated at a high temperature, e.g. at a temperature of greater than 1500° C. and in an inert or reducing atmosphere to produce silicon carbide. Alternatively, silicon nitride may be produced by heating the coked rice hulls in an atmosphere containing nitrogen or a reactive nitrogen-containing compound. The use of rice hulls in the production of ceramic materials is of course not very versatile as they may be used only in the production of a few ceramic materials, namely silicon carbide and silicon nitride. Carbides and nitrides of elements other than silicon cannot be produced from rice hulls.

The quality of the ceramic material which is produced by these previously described processes is dependent at least in part on the composition and structure of the precursor from which the ceramic material is produced and on the processing conditions. For example, where silicon carbide is produced from a precursor which is a mixture of silica and carbon there is no difficulty in achieving the overall ratio of silica to carbon which is required to produce silicon carbide by the carbothermic reaction but it is impossible to achieve the intimate contact between the silica and the carbon in the precursor which is necessary in order to produce a silicon carbide product of uniform composition on a microscale, let alone on a molecular scale, and which is free from unreacted silica and/or carbon.

Where the ceramic material is produced by pyrolysis of a precursor which is a reaction product which contains the elements of the ceramic material, for example a reaction product which contains silicon and carbon or a reaction product which contains silica and carbon, the elements may not be present in the proportion required for producing a ceramic material substantially free of impurities and, moreover, it may be difficult to produce the precursor reaction product in a tractable and readily handlable form from which the ceramic material may be produced in the desired form. For example, the precursor reaction product may be formed in an intractable mass from which it may be difficult if not impossible to produce particulate ceramic material, particularly ceramic material of small and relatively uniform particle size.

Ceramic materials have been used for many years in such applications as abrasives and in the manufacture of tools. Whereas in these applications the quality of the ceramic material might not have been of critical importance there are other applications of ceramic materials which are of more recent development where the quality of the ceramic material and its physical form may be of critical importance. These more recently developed applications of ceramic materials include applications as engineering materials and use in electronic applications.

The present invention provides a process for the production of a precursor which is a polymeric material and from which a ceramic material may be produced, and to a process for the production of the ceramic material from the precursor. The former process is very versatile in that it may be used in the production of precursors for a wide variety of ceramic materials, for example, for the production of precursors which may be converted to carbides, nitrides, borides and silicides of a variety of metallic or non-metallic elements, and it results in production of precursor which is in a particularly desireable particulate form and from which a particulate ceramic material may readily be produced.

According to the present invention there is provided a process for the production of a precursor which is a polymeric material comprising at least one metallic or non-metallic element, oxygen and carbon and from which a ceramic material may be produced by pyrolysis, which process comprises reacting (1) a first reactant which comprises a compound or compounds of at least one metallic or non-metallic element having two or more groups reactive with hydroxyl groups, and (2) a second reactant which comprises at least one organic compound having two or more hydroxyl groups, said reaction being effected in a liquid medium in which the reactants are soluble and or dispersible and in which the polymeric material which is produced by the reaction is insoluble or in which the polymeric material may be caused to be insoluble, precipitating the polymeric material in the liquid medium in particulate form, and recovering the polymeric material from the liquid medium in particulate form.

The process of the invention is in effect a dispersion polymerisation process. In the process the reactants are chosen so as to be miscible with each other in which case the liquid medium may comprise the mixture of reactants, and/or to be soluble in a common solvent in which case the reactants and the solvent form a homogenous liquid medium, or to be readily dispersible in the liquid medium. In this latter case one of the reactants may be soluble in a solvent and the other of the reactants may be dispersed in the solvent, or both reactants may be dispersed in the solvent. The polymeric material which is produced by reaction is either insoluble in the liquid medium. e.g. in the common solvent, such that the polymeric material which is produced is precipitated, or the polymeric material which is produced by reaction is caused to be precipitated, for example by addition of a non-solvent to the liquid medium, or by removal of a reaction product or by removal of some solvent, and the precipitated polymeric material is recovered from the liquid medium. As the polymeric material is a precursor for the subsequent production of a particulate ceramic material, it is important that the polymeric material which is precipitated and recovered is in a particulate form. The form of the polymeric material which is precipitated, and in particular the size of the particles of polymeric material which are precipitated, may be controlled by use of high speed mixing of the reactants, by variation of the concentrations of the reactants in the liquid medium, and by use of a dispersing agent in the liquid medium, as will be disclosed in more detail hereafter.

The ability to produce the polymeric material precursor in particulate form, and in particular the ability to produce the precursor in the form of small size spherical particles, is especially important. Thus, a precursor in such a form is especially suitable for use in the production of particulate ceramic materials by pyrolysis of the precursor, and small size particles of precursor may be converted to small size particles of ceramic material which is an especially desirable form for the latter material. Furthermore, the process of the invention may be operated to control the particle size of the precursor and thus the size of the particles of ceramic material produced from the precursor.

The polymeric material precursor is pyrolysed in a subsequent step or steps to produce a ceramic material. The precursor may be heated in a first additional step at elevated temperature to produce a coked product which comprises an extremely intimate mixture of an oxide of the metallic or non-metallic element and carbon, and in a second additional step the coked product may be further heated at elevated temperature to produce a ceramic material. For example, the coked product may be heated in an inert atmosphere to produce a carbide of the metallic or non-metallic element, or the coked product may be heated in an atmosphere of nitrogen or of a reactive nitrogen- containing compound to produce a nitride of the metallic or non-metallic element. Alternatively, where the first reactant comprises a compound of a metallic or non- metallic element, and a compound of boron or silicon such that the precursor which is produced in the process of the invention comprises the metallic or non-metallic element, boron or silicon, oxygen and carbon, and the coked product produced therefrom comprises an intimate mixture of carbon, an oxide of the metallic or non-metallic element, and an oxide of boron or silicon, the coked product may be heated at elevated temperature in an inert atmosphere to produce a boride or silicide of the metallic or non-metallic element.

In the process of the invention the first reactant comprises a compound of a metallic or non-metallic element having two or more groups reactive with hydroxyl groups and the second reactant comprises an organic compound having two or more hydroxyl groups.

The metallic or non-metallic element must be such as to be capable of forming a ceramic material, e.g. a refractory carbide or nitride, and examples of such elements are aluminium, silicon, titanium, tantalum, zirconium, hafnium, tungsten, and boron, although the process is not limited to use with compounds of these specific elements. The compound of the metallic or non-metallic element comprises at least two groups reactive with hydroxyl groups, and it may in addition comprise groups which are not so reactive. For example, the compound may have a formula $MX_nY_m$ where M is the metallic or non-metallic element, X is a group which is reactive with hydroxyl groups and Y is a group which is not reactive with hydroxyl groups, n is an integer of at least 2, and m is zero or an integer. The group X may be, for example, halide, e.g. chloride or bromide; amide; or alkoxy, e.g. a group of the formula OR where R is an alkyl group having for example from 1 to 8 carbon atoms, e.g. methoxy, ethoxy or butoxy. The group Y, if present in the compound of the metallic or non-metallic element, may be, for example, a hydrocarbyl group, e.g. alkyl, cycloalkyl, aryl or alkaryl. Specific examples of such groups include, methyl, ethyl, propyl, cyclohexyl and benzyl. The group Y may be an oxy group, for example, the compound of the metallic or non-metallic element may be an oxyhalide.

Specific examples of compounds of metallic or non-metallic elements in which all of the groups therein are reactive with hydroxyl groups are tetramethoxysilane, tetraethoxysilane, tetraethoxy zirconium, pentaethoxy tantalum, penta-n-propoxy tantalum, silicon tetrachloride, silicon tetrabromide, titanium tetrachloride, zirconium tetrachloride, dichlorodiethoxy silane, chlorotriethoxy zirconium, dichlorotributoxy tantalum, boron trichloride, boron tri-iso propoxide, aluminium tri-iso propoxide and aluminium trichloride.

Examples of compounds of the metallic or non-metallic element which comprise groups which are, and groups which are not, reactive with hydroxyl groups include methyltrimethoxysilane, methyltriethoxysilane, ethyltriethoxysilane, dimethyldiethoxysilane, dimethyldimethoxysilane, diphenyldiethoxysilane, phenyltrimethoxysilane, and hexachlorodisiloxane, and equivalent compounds of other metallic or non-metallic elements.

The first reactant may comprise two or more of the aforementioned compounds where it is desired, for example to produce a ceramic material, e.g. a carbide or nitride, of two or more different metallic or non- metallic elements. Where it is desired to produce a boride or silicide of a metallic or non-metallic element the first reactant may comprise a compound of boron or silicon and a compound of a metallic or non- metallic element other than boron or silicon.

In general the compound of the metallic or nonmetallic element will not comprise hydroxyl groups as hydroxyl group-containing compounds of metallic or non-metallic elements which are capable of forming a ceramic material are generally unstable, or they may not even exist as hydroxides, or they may readily self- condense to form a polymeric product, or they may exist as a hydrated oxide rather than as a hydroxide, e.g. as in the case of hydrated alumina.

In the process of the invention the compound of the metallic or non-metallic element is reacted with an organic compound having two or more hydroxyl groups to produce a polymeric material. The organic compound may be, for example, aliphatic, aromatic, or cyclaliphatic. Examples of suitable aliphatic organic compounds containing two hydroxyl groups include glycols, e.g. ethylene glycol, propylene glycol, butylene glycol and diethylene glycol. Examples of suitable aliphatic organic compounds containing more than two hydroxyl groups include glycerol, trihydroxy butane and trihydroxy pentane. Examples of cycloaliphatic organic compounds containing at least two hydroxyl groups include dihydroxycyclohexane and trihydroxycyclohexane. Aromatic organic compounds which comprise two or more hydroxyl groups are advantageous as they comprise a large proportion of carbon and, when incorporated into the polymeric material, assist in achieving the required proportion of carbon to oxide of the metallic or non-metallic element in the coked product produced from the polymeric material. Examples of such aromatic compounds include cresols, dihydroxytoluene, and dihydroxynaphthalene.

The second reactant may comprise two or more of the aforementioned compounds.

In order that the ceramic material which is produced from the coked product may have the desired composition it is desirable that the proportion of carbon to the oxide of the metallic or non-metallic element in the coked product be near to or substantially the proportion which is theoretically required. For example, in the production of a carbide from a coked product which comprises a mixture of carbon and an oxide $MO_2$, as in the case of $SiO_2$, $TiO_2$, and $ZrO_2$, the so-called carbothermic reaction is $$MO_2 + 3C \rightarrow MC + 2CO$$

and the theoretically required molar proportion of the oxide to carbon is 1 to 3. In the cases of the oxides of silicon, titanium and zirconium the theoretically required proportions by weight of oxide and carbon are

| | | | |
|---|---|---|---|
| SiO$_2$ | 62.5% | carbon: SiO$_2$ | 1:1.67 |
| carbon | 37.5% | | |
| TiO$_2$ | 68.9% | carbon: TiO$_2$ | 1:2.22 |
| carbon | 31.1% | | |
| ZrO$_2$ | 77.4% | carbon: ZrO$_2$ | 1:3.42 |
| carbon | 22.6% | | |

The stoichiometry of the carbothermic reaction may be different, as in the case of reaction between carbon and the oxide of tantalum.

$$Ta_2O_5 + 7C \rightarrow 2TaC + 5CO$$

In this case the molar proportion of oxide to carbon which is theoretically required is 1 to 7, which corresponds to 84 weight % of $Ta_2O_5$ and 16 weight % of carbon in the coked product produced from the polymeric product, that is a proportion by weight of carbon: $Ta_2O_5$ of 1:5.25.

The proportion of carbon to oxide of the metallic or non-metallic element which is required in the coked product may be different where a nitride is to be produced. For example, in the case of the elements titanium, vanadium, zirconium and hafnium the oxides of which may be represented by the formula $MO_2$ and the nitrides of which may be represented by the formula MN, the overall reaction may be represented as $$2MO_2 + 4C + N_2 \rightarrow 2MN + 4CO.$$

The stoichiometric proportion which is theoretically required is a molar proportion of oxide to carbon of 1:2, which corresponds to the following proportions by weight

| | | | |
|---|---|---|---|
| TiO$_2$ | 76.9% | carbon: TiO$_2$ | 1:3.33 |
| carbon | 23.1% | | |
| VO$_2$ | 77.5% | carbon: VO$_2$ | 1:3.44 |
| carbon | 22.5% | | |
| ZrO$_2$ | 83.7% | carbon: ZrO$_2$ | 1:5.13 |
| carbon | 16.3% | | |
| HfO$_2$ | 89.8% | carbon: HfO$_2$ | 1:8.80 |
| carbon | 10.2% | | |

The proportion of carbon to the oxide of the metallic or non-metallic element in the coked product may be controlled by choice of the first and second reactants, and by choice of the proportion of these reactants, used in production of the polymeric material. For example, where a relatively high proportion of carbon is required in the coked product the second reactant may comprise an organic compound which contains a cyclic group, e.g. an aromatic or cycloaliphatic group, or a group which is unsaturated, as the loss of carbon when a polymeric product produced from such a compound is converted to a coked product is not great, that is, there is a high carbon yield. Suitable such organic compounds include dihydroxynaphthalene and dihydroxycyclohexane. On the other hand, organic compounds containing aliphatic groups tend to suffer a high loss of carbon when a polymeric product produced from such a compound is converted to a coked product, and the loss of carbon is not greatly dependent on the chain length of the aliphatic group. Thus, where a coked product containing a high proportion of carbon is desired the use of aliphatic glycols and polyols, at least in a high proportion, is not preferred. The production of a polymeric material, and a coked product, which contains a high proportion of carbon is also favoured by use of an additional reactant which comprises an organic compound containing a single hydroxyl group, for example, an alcohol containing a cyclic group, e.g. cyclohexanol, or an alcohol which contains an unsaturated group and which is also preferably cyclic, e.g. furfuryl alcohol. Such a reactant containing a single hydroxyl group reacts with the first reactant to form a unit pendant from the chain of the polymeric material rather than a unit within the chain of the polymeric material. Where a relatively high proportion of oxide of the metallic or non-metallic element is desired in the coked product an additional reactant may be used in production of the polymeric material which comprises a compound of the metallic or non-metallic element having a single group reactive with hydroxyl groups. Such a compound reacts with the second reactant to form a unit pendant from the chain of the polymeric material rather than a unit within the chain of the polymeric material. Examples of such reactants include a trialkyl alkoxy silane, e.g. trimethyl ethoxy silane, and corresponding compounds of titanium, zirconium, vanadium, tantalum and other metallic and non-metallic elements.

The process of the invention is effected in a liquid medium in which the reactants are soluble or dispersible, and the reactants, and the proportions thereof, and the solvents for the reactants, if any, are chosen such that the reactants are miscible with each other or are soluble or readily dispersible in a common solvent. Thus, the first reactant, that is the metallic or non-metallic compound, and the second reactant, that is the organic compound, should be miscible with each other or soluble in or dispersible in a common solvent. Where reaction is effected between reactants which are miscible with each other, or where reaction is effected in a solvent for the reactants, and the polymeric material which is produced is precipitated, it is possible to produce the polymeric material in the form of small and uniform sized particles having a uniform composition. A polymeric material of such form may also be produced where a dispersion of the reactants in a liquid medium is polymerised particularly where a colloidal dispersion of the reactants is polymerised.

Reactants which are miscible with each other and solvents in which to dissolve or disperse reactants, may be chosen by means of simple experiment, particularly with the assistance of the following examples of such reactants and solvents.

Examples of compounds of metallic or non-metallic elements and of organic compounds containing hydroxyl groups which are miscible with each other include tetraethoxysilane and glycerol, optionally containing also furfuryl alcohol, tetraethoxysilane and diethylene glycol, optionally also containing furfuryl alcohol, and triethoxy boron and glycerol when heated to a slightly elevated temperature.

Solvents which may be used include high boiling hydrocarbons, e.g. those boiling at a temperature above 200° C., petroleum ethers and liquid paraffins. Ethanol is a suitable solvent for use with a variety of different compounds of metallic or non-metallic elements and organic compounds containing hydroxyl groups, for example titanium tetrachloride and glycerol, titanium tetraethoxide and glycerol, titanium, tetraethoxide and glycerol optionally admixed with furfuryl alcohol, aluminium trichloride and glycerol, aluminium triisopropxide and glycerol optionally admixed with furfuryl alcohol, zirconium tetrachloride, glycerol and furfuryl aclohol, tetraethoxysilane and cyclohexane-1,4-diol, resorcinol or 1,3,5-trihydroxybenzene, and hafnium tetrachloride and glycerol.

Even when the reactants are miscible with each other they may be reacted in the presence of a solvent in which they are soluble, or dispersible. Indeed, the use of such a solvent is preferred for reasons which will be explained hereafter.

Where the reactants are neither miscible with each other nor soluble in a common solvent they must be reacted with each other in the form of a dispersion in a liquid medium, preferably in the form of a colloidal dispersion. The use of a dispersant assists in forming and maintaining such as dispersion.

As reaction between the metallic or non-metallic compound and the organic compound containing hydroxyl group is in the nature of a condensation polymerisation the proportions of the reactants will be chosen to achieve the required condensation, and there may be little scope for variation in the proportions of the reactants. Thus, the proportions of the reactants chosen will depend on the number of groups reactive with hydroxyl groups in the metallic or non-metallic compound and on the number of hydroxyl groups in the organic compound. The relative proportions of the reactants may be chosen such that in the reaction mixture there is an approximately equimolar proportion of hydroxyl groups to groups reactive with hydroxyl groups. For example, where tetraethoxysilane, which contains four reactive groups, is reacted with glycerol, which contains three reactive groups, the reaction is a transesterification in which ethanol is eliminated and for a polymeric material of reasonably high molecular weight to be produced the molar proportion of tetraethoxysilane to glycerol which is chosen may be in the region of 3:4. However, excess of one reactant over the others may be chosen in order to force reaction towards completion.

In the process of the invention reaction is effected in a medium in which the reactants are soluble or dispersible and in which the polymeric material which is produced is precipitated in particulate form. The polymeric material which is formed must thus be insoluble in the medium. Formation of the polymeric material in particulate form may be assisted by effecting the reaction in the presence of a common solvent for the reactants, rather than merely in a homogenous mixture of the reactants, and by selection of the concentration of the reactants in the solvent. Although the optimum concentration of reactants in the common solvent for formation of particulate polymeric material may depend to some extent on the nature of the reactants the concentration of the first reactant and of the second reactant, and any additional reactants which may be present will generally be in total in the range 5% to 60% by weight of the total weight of the reactants and liquid medium. The formation of polymeric material in particulate form is also assisted by thoroughly and vigorously agitating the reactants, and by use of a dispersing agent which assists in maintaining the polymeric material well dispersed in the reaction medium. The concentration of dispersing agent which is suitably used will depend on the concentration of the reactants in the reaction medium, but the concentration is suitably in the range of 0.5% to 10% by weight of the total weight of the first and second reactants and of any additional reactants. Suitable dispersing agents include materials which have an affinity for the polymeric material which is formed in the reaction and for the liquid medium. Examples of suitable dispersing agents include derivatives of polyhydroxy stearic acid e.g. a polyhydroxy stearic acid derivative of glycidyl methacrylate, or polymethyl methacrylate reacted with polyhydroxy stearic acid and containing residual acid groups. Use of a dispersing agent is also recommended where one or more of the reactants is in the form of a dispersion in a liquid medium, particularly where a dispersion is desired which is essentially colloidal.

The particle size of the polymeric material which is produced may also be controlled by selection of the concentration of the reactants in the reaction medium, by use of a dispersing agent, and by selection of the concentration thereof, by control of the extent of the reaction of the reactants, and by use of vigorous agitation. In general, the particle size of the polymeric material will be smaller the lower is the concentration of the reactants in the reaction medium and the greater is the concentration of the dispersing agent, the more thoroughly is the reaction medium agitated, and the lower is the conversion of the reactants to polymeric material, although the aforementioned criteria are intended for general guidance only.

The particle size of the ceramic material which is ultimately produced will depend on the particle size of the polymeric material from which the ceramic material is produced. A particle size for the polymeric material in the range 1 to 500 microns will generally be suitable. A preferred particle size is less than 100 microns.

It may be advisable, or even necessary, to effect reaction under a dry inert atmosphere, particularly where the compound of the metallic or non- metallic element is readily hydrolysable, for example, where the metallic or non-metallic element is an alkoxide, e.g. where the compound is an alkoxide of silicon or titanium. Some halides of metallic or non- metallic elements, e.g. $SiCl_4$ and $TiCl_4$, are also readily hydrolysable.

The temperature at which reaction is effected will depend on the particular reactants. Thus, with reactants such as silicon tetrahalides or glycols or polyols, e.g. ethylene glycol or glycerol, reaction may be allowed to proceed at or about ambient temperature, although with other reactants, and where reaction is effected in a solvent, it may be necessary to effect reaction at elevated temperature. The reaction temperature will generally not be above the boiling point of the solvent, although a temperature above the boiling point may be used. Reaction may be effected at elevated temperature in order to remove a reaction product and in order to assist in formation of the polymeric material. For example, where the reaction is a transesterification reaction in which an alcohol is eliminated, e.g. as in the case of reaction of a silicon alkoxide with a hydroxy compound, the reaction temperature is preferably above the boiling point of the alcohol which is eliminated on reaction.

Reaction may be assisted by the presence in the reaction mixture of suitable catalysts, for example, acid catalysts in the case where the reaction is a transesterification reaction. Suitable catalysts for such transesterification reactions are known in the art.

The polymeric material which is produced may precipitate from the liquid medium, e.g. from the solvent in which reaction is effected, without any special steps being taken required to achieved this precipitation. On the other hand, it may be necessary to cause the polymeric material to precipitate or at least to assist the precipitation to take place. This may be achieved, for example, by addition of a non-solvent to the reaction mixture, or by removal of some of the solvent from the reaction mixture, or by removal of a reaction product from the reaction mixture, e.g. by removal of the alcohol which is produced by reaction between an ester of a metallic or non-metallic element and an organic compound having two or more hydroxyl groups. Removal of such a reaction product or a part of such a solvent may be effected by distillation.

The polymeric material which is produced may be separated by any convenient means, for example by filtration of the reaction medium, and it may be washed to remove solvent and unreacted reactants and dried.

The process of this invention may be operated in a continuous manner. Thus, the first and second reactants, and optionally a dispersing agent and a solvent for the reactants, may be charged continuously to a reaction vessel, the contents of the reaction vessel may be removed continuously from the reaction vessel, and the polymeric material may be separated from the contents of the reaction vessel which have been removed therefrom. After separation of the polymeric material the unreacted reactants, and solvents and dispersing agents if present, may be returned to the reaction vessel, additional reactants, and solvents and dispersing agent if used, also being charged to the reaction vessel as necessary.

In a subsequent step or steps the particulate polymeric material produced in the process of the invention may be pyrolysed to produce a particulate ceramic material. The polymeric material may be pyrolysed in two steps which comprise a first step of heating the material at elevated temperature to produce a coked product which comprises an extremely intimate mixture of an oxide of the metallic or non-metallic element and carbon, and a second step of heating the coked product at elevated temperature to produce a ceramic material, e.g. in an inert atmosphere to produce a carbide of a metallic or non-metallic element, or in an atmosphere containing nitrogen or a reactive nitrogen-containing compound to produce a nitride of a metallic or non-metallic element. This further processing of the polymeric material will be described with reference to a two step procedure.

The temperature at which heating is effected in the coking step will depend on the nature of the organic component of the polymeric material but in general a temperature of up to 600° C. will suffice, although a higher temperature may be used, e.g. a temperature up to about 800° C. The heating should be effected for a time sufficient for the organic component of the polymeric material to become substantially fully carbonised, for example, for a time sufficient for there to be no further loss in weight of the coked product at the chosen temperature.

In the second step of the pyrolysis the coked product is heated to a temperature above that at which the coking step was effected in order to effect a carbothermic reaction between the carbon and the oxide of the metallic or non-metallic element in the coked product. A temperature of up to about 1600° C., possibly somewhat greater, e.g. up to 1800° C., will generally suffice, and the heating should be effected in an inert atmosphere, for example in an atmosphere of an inert gas, e.g. helium, where a carbide of the metallic or non-metallic element is to be produced by the carbothermic reaction, or the heating should be effected in an atmosphere of a reactive nitrogen-compound, for example nitrogen itself or ammonia, where a nitride of the metallic or non-metallic element is to be produced.

The invention is illustrated by the following examples.

EXAMPLE 1

The following reaction mixture was charged under nitrogen to a reaction vessel equipped with a high speed stirrer, a reflux condenser and an inlet and outlet for nitrogen.

| | |
|---|---|
| Tetraethoxysilane | 92.7 g |
| Furfurylalcohol | 22 g |
| Glycerol | 30 g |
| Tetraisobutane 90[1] | 250 ml |
| Dispersant[2] | 1.5 g |

[1]Mainly C16 isoparaffins with a proportion of C12 isoparaffins, boiling point 225 to 255° C.
[2]50 weight percent solution in white spirit of a polyhydroxystearic acid derivative of glycidyl methacrylate.

The contents of the reaction vessel, which were in the form of a solution, were heated at reflux temperature for 3 hours under an atmosphere of nitrogen, and vigorously stirred. Thereafter the vigorous stirring was continued and a liquid phase which consisted mainly of ethanol and some unreacted tetraethoxysilane, was distilled off from the reaction vessel, initially at a temperature of 80° C. As the distillation proceeded a polymeric material was precipitated as fine brown particles, and distillation was continued until a temperature of 190° C. was reached at which no further liquid could be distilled off. The contents of the reaction vesel were then allowed to cool, an equal volume of 40–60 petroleum ether was added, the contents were filtered to separate the particulate polymeric material, and the particulate material was washed with petroleum ether and dried in vacuum at 60° C. The yield of the fine particles of particulate polymeric material was 54.2g.

The particulate polymeric material, which contained 15.3 wt % silicon, and 39.3 wt % carbon, and oxygen, was heated up to a temperature of 800° C. under a nitrogen atmosphere at a rate of increase of temperature of 7° C. per minute to produce a coked product consisting of silica and carbon, (62.5 weight % silica and 37.5 wt % carbon), and the coked product was heated in an atmosphere of helium, the temperature being raised at a rate of 7° C. per minute from ambient temperature up to 450° C. and thereafter at a rate of 5° C. per minute up to 1600° C.

Examination of the particulate product by X-ray diffraction and Raman spectroscopy showed it to contain β SiC, and the product also contained some residual carbon. The product consisted of fine particles.

EXAMPLE 2

The procedure of example 1 was repeated except that the reaction mixture consisted of

| | |
|---|---|
| Aluminium triisopropoxide | 46.6 g |
| Furfuryl alcohol | 10 g |
| Glycerol | 12.3 g |
| Tetraisobutane 90 | 150 ml |
| Dispersant[1] | 2 g |

[1]Polymethyl methacrylate containing polyhydroxy stearic acid groups.

the liquid phase which was distilled off consisted mainly of isopropanol, the maximum temperature which was reached was 150° C., and the particulate polymeric material which was produced consisted of fine particles of a pale yellow coloured material. The polymeric material consisted of carbon 13.62 wt%, hydrogen 4.6 wt %, aluminium 19.0 wt %, and oxygen, and particle size analysis showed 100% of the particles to have a size less than 100 microns and the median particle size to be 10 microns. The pale yellow polymeric material was pyrolysed to a coked product, and the coked product was further pyrolysed by heating, following the procedure described in Example 1, except that the pyrolysis of the coked product was effected under an atmosphere of nitrogen.

Examination of the fine particles of the resultant product by X-ray diffraction and Raman spectroscopy showed it to consist of AlN with some residual carbon.

EXAMPLE 3

The polymerisation procedure of Example 1 was repeated except that the reaction mixture consisted of

| | |
|---|---|
| Titanium tetraethoxide | 11.4 g |
| Triethyl boron | 14.6 g |
| Glycerol | 18.4 g |
| Tetraisobutane 90 | 50 ml |
| Dispersant (as used in Example 2) | 1.0 g | and the maximum temperature which was reached was 150° C. The particulate polymeric material was produced in the form of a white particulate material and in a yield of 20.5g. The particles of polymeric material had a median size of 11 microns and 100% of the particles had a size of less than 113 microns.

The polymeric material served as a precursor for the production of titanium boride.

EXAMPLE 4

The polymerisation procedure of Example 1 was repeated except that the reaction mixture consisted of

| | |
|---|---|
| Tetraethoxy silane | 43.5 g |
| Furfuryl alcohol | 13.7 g |
| Glycerol | 20 g |
| Liquid paraffin | 200 ml |
| Dispersant (as used in Example 2) | 1.2 g |

The product of polymerisation was a brown polymeric material in the form of fine brown particles. The yield was of polymeric material 30 g.

EXAMPLE 5

The polymerisation procedure of Example 2 was repeated except that the reaction mixture consisted of

| | |
|---|---|
| Aluminium triisopropoxide | 51 g |
| Furfuryl alcohol | 14.7 g |
| Glycerol | 13.8 g |
| Ethanol | 90 ml |
| Tetraisobutane 90 | 100 ml |
| Dispersant (as used in Example 1) | 5.0 g |

The product of polymerisation was a pale yellow coloured polymeric material in the form of fine particles. The Yield was 42g.

EXAMPLE 6

The polymerisation procedure of Example 2 was repeated except that the reaction mixture consisted of

| | |
|---|---|
| Aluminium isopropoxide | 25.5 kg |
| Furfuryl alcohol | 5.4 kg |
| Glycerol | 6.7 kg |
| Liquid paraffin | 75 liters |
| Dispersant (as used in Example 3) | 1.0 kg |

The product of polymerisation was pale yellow coloured polymeric material in the form of fine particles. The yield was of polymeric material 16.5kg.

EXAMPLE 7

The procedure of Example 1 was repeated except that the reaction mixture consisted of

| | |
|---|---|
| Aluminium triisopropoxide | 46.6 g |
| Furfuryl alcohol | 11 g |
| Glycerol | 12.4 g |
| Tetraisobutane 90 | 75 ml |
| Dispersant (as used in Example 2) | 2.0 g | the contents of the reaction vessel were heated at 150° C. for 1 hour, and isopropanol was distilled from the reaction vessel. The polymeric material formed in the reaction which, was in the form of pale yellow coloured fine particles, was filtered, washed with a low boiling point paraffin, and dried under vacuum for 1 hour at 70° C. The yield of polymeric material was 36.7 g, the median size of the particles of polymeric material was 10 microns and the particles had a size of less than 65 microns, and the polymeric material consisted of carbon 35.10 wt %, hydrogen 5.89 wt %, aluminium 14.2 wt %, and oxygen.

EXAMPLE 8

The procedure of Example 7 was repeated except that the reaction mixture contained 150 ml of tetraisobutane and 0.5 g of dispersant 41 g of polymeric material were produced in the form of fine particles, the particles had a mean size of 4 microns and 100% of the particles had a size of less than 65 microns, and the polymeric material consisted of carbon 46.02 wt %, hydrogen 7.45 wt %, aluminium 13.1 wt % , and oxygen.

EXAMPLE 9

The procedure of Example 7 was repeated except that the reaction mixture consisted of

| | |
|---|---|
| Aluminium triisopropoxide | 23.3 g |
| Furfuryl alcohol | 5.5 g |
| Glycerol | 6.2 g |
| Diethylene glycol dimethyl ether | 75 ml |
| Dispersant (as used in Example 2) | 1 g |

17g of polymeric material were produced in the form of fine particles, 100% of the particles had a size of less than 100 microns and 50% had a size of less than 11 microns, and the polymeric material consisted of carbon 36.12 wt %, hydrogen 5.70 wt %, aluminium 13.90 wt %, and oxygen.

EXAMPLE 10

The procedure of Example 9 was repeated except that the diethylene glycol dimethylether was replaced by 75ml of N-methyl pyrollidone.

18g of polymeric material were produced in the form of fine particles, the median size of the particles was 10 microns and the particles had a size of less than 65 microns, and polymeric material consisted of carbon 35.50 wt %, hydrogen 5.54 wt %, aluminium 14.1 wt %, and oxygen.

EXAMPLE 11

The procedure of Example 7 was repeated except that the reaction mixture consisted of

| Titanium tetraethoxide | 22.9 g |
| Furfuryl alcohol | 9.8 g |
| Glycerol | 9.2 g |
| Tetraisobutane 90 | 80 ml |
| Dispersant (as used in Example 2) | 1 g | the contents of the reaction vessel were heated at 160° C. for 1 hour, and ethanol was distilled from the reaction vessel.

21.4g of polymeric material were produced in the form of fine particles, 100% of the particles had a size of less than 100 microns and 50% of the particles had a size of less than 25 microns, and the polymeric material consisted of carbon 40.60 wt %, hydrogen 4.97 wt %, titanium 20.4 wt %, and oxygen.

EXAMPLE 12

The procedure of Example 11 was repeated except that the reaction mixture consisted of

| Titanium tetraethoxide | 29.2 g |
| Furfuryl alcohol | 11 g |
| Glycerol | 9.2 g |
| Tetraisobutane 90 | 50 ml |
| Dispersant (as used in Example 2) | 1 g |

24g of polymeric material were produced in the form of fine particles, 100% of the particles had a size of less than 160 microns and 50% of the particles had a size of less than 20 microns, and the polymeric material consisted of carbon 41.27 wt %, hydrogen 4.95 wt %, titanium 20.2 wt %, and oxygen.

EXAMPLE 13

The procedure of Example 7 was repeated except that the reaction mixture consisted of

| Titanium tetraethoxide | 22.9 g |
| Boron trimethoxide | 11.6 g |
| Furfuryl alcohol | 19.8 g |
| Glycerol | 11 g |
| Tetraisobutane 90 | 100 ml |
| Dispersant (as used in Example 2) | 2 g | the contents of the reaction vessel were heated at 160° C. for 1 hour, and methanol and ethanol was distilled from the reaction vessel.

33g of polymeric material were produced in the form of fine particles, 100% of the particles had a size of less than 280 microns and 50% of the particles had a size of less than 105 microns, and the polymeric material consisted of carbon 40.15 wt %, hydrogen 4.54 wt %, titanium 12.6 wt %, boron 4.43 wt % and oxygen.

Titanium boride was produced by pyrolysis of the polymeric material.

We claim:

1. In a process for the production of precursor which is a polymeric material comprising at least one metallic or non-metallic element, oxygen and carbon and from which a ceramic material may be produced by pyrolysis, which process comprises reacting
   (1) a first reactant having the formula $MX_nY_m$ where M is a metallic or non-metallic element, X is a group which is reactive with hydroxyl groups and Y is a group which is not reactive with hydroxyl groups, n is an integer of at least 2, and m is zero or an integer, and
   (2) a second reactant which comprises at least one organic compound having two or more hydroxyl groups,
the improvement which comprises conducting said reaction as a dispersion polymerization in a liquid medium in which the reactants are soluble and in which the polymeric material which is produced by the reaction is insoluble or in which the polymeric material may be caused to be insoluble, precipitating the polymeric material in the liquid medium in particulate form, and recovering from the liquid medium the polymeric material, 2. A process as claimed in claim 1 in which the reactants are soluble in a common solvent.

3. A process as claimed in claim 2 in which the polymeric material is insoluble in the common solvent.

4. A process as claimed in claim 1 in which the polymeric material is caused to be precipitated by removal of a reaction product from the liquid medium.

5. A process as claimed in claim 1 in which the first reactant comprises a compound of aluminum, silicon, titanium, tantalum, zirconium, hafnium, tungsten or boron.

6. A process as claimed in claim 1 in which X is a halide group, an amide group or an alkoxy group.

7. A process as claimed in claim 1 in which the first reactant comprises a compound of boron or silicon and a compound of a metallic or non-metallic element other than boron or silicon.

8. A process as claimed in claim 1 in which the second reactant comprises a glycol, glycerol or mixture of glycol and glycerol.

9. A process as claimed in claim 1 in which the second reactant comprises an organic compound which contains a cyclic group.

10. A process as claimed in claim 1 in which the second reactant comprises an organic compound which contains an unsaturated group.

11. A process as claimed in claim 1 which comprises reacting an additional reactant which comprises an organic compound containing a single hydroxy group.

12. A process as claimed in claim 11 in which the additional reactant contains a cyclic group.

13. A process as claimed in claim 11 in which the additional reactant contains an unsaturated group.

14. A process as claimed in claim 1 which comprises reacting an additional reactant which comprises a compound of a metallic or non-metallic element having a single group reactive with hydroxyl groups.

15. A process as claimed in claim 1 in which the liquid medium comprises a hydrocarbon.

16. A process as claimed in claim 15 in which the hydrocarbon has a boiling point greater than 200° C.

17. A process as claimed in claim 11 in which the concentration of the first reactant and the second reactant, and of the additional reactant is in the range 5% to 60% by weight of the total weight of the reactants and the liquid medium.

18. A process as claimed in claim 1 in which the reactants are vigorously agitated.

19. A process as claimed in claim 1 in which a dispersing agent is used.

20. A process as claimed in claim 19 in which the concentration of the dispersing agent is in the range 0.5 to 10% by weight of the total weight of the first and second reactants, and of the additional reactant.

21. A process as claimed in claim 1 in which the polymeric material which is produced has a particle size of 1 to 500 microns.

22. A process as claimed in claim 1 in which reaction is affected under a dry inert atmosphere.

23. A polymeric material in particulate form produced by a process as claimed in claim 1.

24. A process as claimed in claim 1 in which the polymeric material is pyrolysed in an additional step or steps to produce a ceramic material.

25. A process as claimed in claim 23 in which in a first additional step the polymeric material is heated at elevated temperature to produce a coked product which comprises an intimate mixture of an oxide of the metallic or non-metallic element, and in a second additional step the coked product is heated at elevated temperature to produce a ceramic material.

26. A process as claimed in claim 25 in which the coked product is heated in an inert atmosphere to produce a carbide of the metallic or non-metallic element.

27. A process as claimed in claim 25 in which the coked product is heated in an atmosphere of nitrogen or of a reactive nitrogen-containing compound to produce a nitride of the metallic or non-metallic element.

* * * * *